US009420429B2

(12) United States Patent
Segev et al.

(10) Patent No.: US 9,420,429 B2
(45) Date of Patent: Aug. 16, 2016

(54) TECHNIQUES FOR TRUSTED LOCATION APPLICATION AND LOCATION PROVIDER COMMUNICATIONS

(71) Applicant: INTEL CORPORATION, Santa Clara, CA (US)

(72) Inventors: Jonathan Segev, Tel Mond (IL); Itai Steiner, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 13 days.

(21) Appl. No.: 14/128,615

(22) PCT Filed: Sep. 27, 2013

(86) PCT No.: PCT/US2013/062318
§ 371 (c)(1),
(2) Date: Dec. 22, 2013

(87) PCT Pub. No.: WO2014/171967
PCT Pub. Date: Oct. 23, 2014

(65) Prior Publication Data

US 2015/0030157 A1 Jan. 29, 2015

Related U.S. Application Data

(60) Provisional application No. 61/813,761, filed on Apr. 19, 2013.

(51) Int. Cl.
*H04K 1/00* (2006.01)
*H04W 4/04* (2009.01)
(Continued)

(52) U.S. Cl.
CPC ............... *H04W 4/04* (2013.01); *G01S 5/0027* (2013.01); *G01S 5/0205* (2013.01); *H04W 4/20* (2013.01); *H04W 12/04* (2013.01); *H04L 63/0428* (2013.01)

(58) Field of Classification Search
CPC ......... H04W 4/04; H04W 4/20; H04W 12/04; G01S 5/0205; G01S 5/0027; H04L 63/0428
USPC ........................................................ 380/270
See application file for complete search history.

(56) References Cited

U.S. PATENT DOCUMENTS 8,370,629 B1 * 2/2013 Ngo et al. .................... 713/168
8,681,741 B1 * 3/2014 Ngo et al. .................... 370/331
(Continued)

FOREIGN PATENT DOCUMENTS

JP 2005181819 7/2005

OTHER PUBLICATIONS

International Search Report and Written Opinion received for PCT Patent Application No. PCT/US2013/062318, mailed Jan. 21, 2014, 12 pages.
(Continued)

*Primary Examiner* — Mohammad W Reza

(57) ABSTRACT

Various embodiments are generally directed to techniques for conveying location information between a location provider and a trusted location application within a mobile device through trusted communications to preclude its provision to an untrusted location application. An apparatus includes a processor component; and a location provider for execution by the processor component comprising a location baseband to determine a current location in a venue based on wireless signals received from a location network of the venue, a verification component to verify a trusted location application associated with the venue based at least on credentials received from the trusted location application, and an encryption component to encrypt location information indicating the current location and convey the location information to the trusted location application through a location manager interposed between the location provider and the trusted location application based on verification of the trusted location application. Other embodiments are described and claimed.

25 Claims, 11 Drawing Sheets location engine 174a
verification component 175a
location provider 170a
credentials 137
location baseband 179a
encryption component 177a
location almanac 334
credentials 337
location manager 140
credentials 537
trusted location application 510
decryption component 517
correlation component 513
presentation component 518
mobile device 100
location data 333
display 180
controls 120
499
AP 494a-c
interface 190
location baseband 179b
encryption component 173b
location provider 170b
credentials 137
location engine 174b
verification component 175b
untrusted location application 110
competing data 133
1000

(51) Int. Cl.

| | |
|---|---|
| ***G01S 5/00*** | (2006.01) |
| ***G01S 5/02*** | (2010.01) |
| ***H04W 12/04*** | (2009.01) |
| ***H04W 4/20*** | (2009.01) |
| *H04L 29/06* | (2006.01) |

(56) References Cited

U.S. PATENT DOCUMENTS

| | | | | |
|---|---|---|---|---|
| 8,914,905 | B2 | 12/2014 | Okuyama et al. | |
| 2003/0159066 | A1 | 8/2003 | Staw et al. | |
| 2004/0224702 | A1 | 11/2004 | Chaskar | |
| 2006/0173612 | A1 | 8/2006 | Steel | |
| 2006/0246920 | A1 | 11/2006 | Shim | |
| 2008/0238676 | A1* | 10/2008 | Dhillon et al. | 340/572.1 |
| 2009/0204815 | A1* | 8/2009 | Dennis et al. | 713/168 |
| 2012/0054841 | A1 | 3/2012 | Schultz et al. | |
| 2013/0067232 | A1 | 3/2013 | Cheung et al. | |

OTHER PUBLICATIONS

Notice of Patent Allowance received for Japanese Patent Application No. 2015-512921, mailed Dec. 22, 2015, 3 pages (untranslated).

* cited by examiner

TECHNIQUES FOR TRUSTED LOCATION APPLICATION AND LOCATION PROVIDER COMMUNICATIONS

TECHNICAL FIELD

Embodiments described herein generally relate to the establishment and use of trusted communications in exchanging location information among components of a mobile device to prevent unauthorized use of the location information.

BACKGROUND

Mobile devices have long had the ability to track their own location relative to the surface of the Earth through receipt and analysis of wireless signals from multiple global positioning system (GPS) or global navigation satellite system (GNSS) satellites. Thus, users of such computing devices, whether carried on their persons or installed within vehicles, have long been able to view a visual presentation of where they are on the surface of the Earth at any given moment. Further, beyond simply presenting location information such as a current set of coordinates, mobile devices have long incorporated location applications to make use of such location information in providing other services (e.g., presenting weather predictions for a current location; presenting locations of shops or gas stations, along with their prices, etc., near a current position; etc.).

More recently, mobile devices have been provided the ability to track their own location relative to an interior of a venue (e.g., an interior of a mall, a store, an airport terminal, etc.) with a finer location accuracy level than possible using signals emanating from satellites, which may also not be able to penetrate portions of such structures to reach their interiors. This is typically done by receiving and analyzing wireless signals emanating from wireless network access points (APs) forming a location network within such a venue, sometimes based on hyperbolic navigation principles. Further, such mobile devices have recently come to incorporate location applications to cooperate with location services provided by such a location network to guide users to locations of particular items of interest within a venue, such as products available for purchase, new products and/or products for which promotions are offered within that venue. Such location applications rely on a location provider of a mobile device that has been configured to interact with such location network providing such location services within a venue to determine a current location of the mobile device relative to rooms, hallways, aisles, shelves, kiosks, information desks, restrooms, etc. The location provider then provides the current location to a location application associated with the venue and able to correlate items of interest to the locations at which those items of interest are offered within that venue. Such correlations are then used to guide a user to items of interest and/or to present promotions (e.g., discounts) associated with those items.

Unfortunately, typical system architectures within such mobile devices have been found to enable a form of "hijacking" of such location information by other location applications that may use such location information to present users with competing information intended to encourage users to leave that venue for a competing venue. More specifically, location information indicating a current location within one venue may be used by a location application of a competing venue to present a user with ads concerning competing products or services offered at the competing venue (sometimes referred to as a "showroom pushing threat").

In such architectures, location information from any location provider of a mobile device is typically freely distributed by a location manager of the mobile device to any location application requesting it from the location manager. The location manager is typically interposed between the location providers and the location applications to provide a platform-agnostic interface for the location applications. Though such free flowing provision of location information by the location manager was originally envisioned as being a benefit, in these situations, it has proven to enable malicious behavior by one location application against another. Further, the fact of the location manager typically being a component of an operating system (OS) of a mobile device has been known to render the location manager vulnerable to being corrupted to enable hijacking.

DETAILED DESCRIPTION

Figure 1:
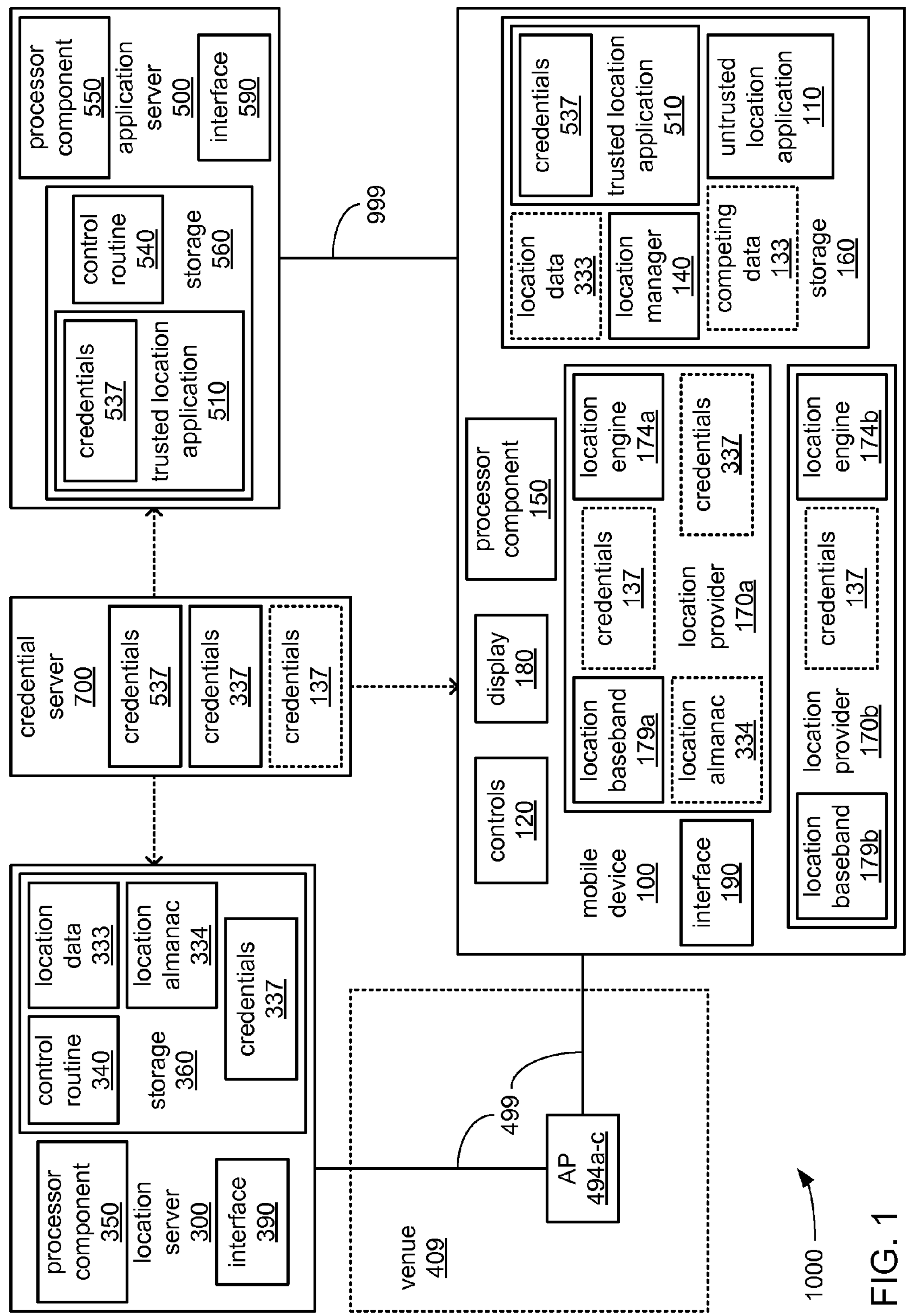
FIG. 1 illustrates an embodiment of a location system.

Various embodiments are generally directed to techniques for conveying location information between a location provider and a trusted location application within a mobile device through trusted communications to preclude provision of the location information to an untrusted location application. The location provider may be one of multiple location providers incorporated into the mobile device, each employing a different technique to determine a current location of the mobile device (e.g., GPS, GNSS, motion sensing, triangulation from signal sources, WiFi-based RSSI or time-of-flight, etc.). The trusted location application may be one of multiple location applications caused to be stored in the mobile device by a user of the mobile device to make use of pieces of location information from one or more of its location providers to perform various functions. The trusted location application may employ the location information received from the location provider to present the user with an indication of a location of an item offered (e.g., offered for sale, rent, etc.) within a venue associated with the trusted location application and/or determine an item of interest to the user based on the manner in which the user moves about within the venue.

The location provider cooperates with a location network of the venue to analyze characteristics of wireless signals received from one or more wireless network access points (APs) within the venue, and/or other stations (STAs) within the venue, to determine a current location of the mobile device within the venue. The location provider may receive a location almanac from an AP of the location network that specifies locations and/or characteristics of one or more APs of the location network, thereby enabling a relatively high location accuracy level in specifying the current location (e.g., an accuracy within 1 meter).

As previously discussed, a location manager may be interposed between the location provider and the trusted location application for the purpose of distributing pieces of location information from one or more location providers to one or more location applications requesting location information. Unfortunately, as also previously discussed, the location manager may be corrupted such that it may not be possible to regard the location manager as trusted. Alternatively or additionally, one of the location applications may be an untrusted location application configured to use the location information associated with the venue to present information concerning items offered at a competing venue to the user in an attempt to induce the user to leave the venue for the competing venue.

Trusted communications may be established through the location manager between the location provider and the trusted location application to enable an exchange of the location information therebetween in a manner that does not permit the untrusted location application and/or the location manager itself to receive it and/or to make use of it. As a prelude to establishing such trusted communications, the location provider may employ a combination of credentials received from the trusted location application and/or the location network to verify the trusted location application as trustworthy to receive the location information. Then, one or both of the location provider and the trusted location application may signal the location manager with a request to route the location information only to the trusted location application from the location provider, instead of distributing it to multiple location applications.

However, in many mobile devices, the location manager is a component of an operating system (OS) for mobile devices, and it is not uncommon for the integrity of an OS to be compromised (e.g., via a virus, etc.). Thus, the location manager may be deemed to be untrusted resulting in uncertainty as to whether the location manager would honor the request to route the location information only to the trusted location application. To counter the possibility that an untrusted location application associated with a competing venue may still be provided with the location information in spite of such a request made to the location manager, the location provider and the trusted location application may employ encryption in exchanging the location information therebetween.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a location system 1000 incorporating one or more of a mobile device 100, a location server 300, an application server 500 and a credential server 700. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

The mobile device 100 may be carried by a user into a venue 409 associated with the location server 300 and in which items are offered (e.g. offered for sale, rent, etc.). In cooperation with one or more access points 494*a-c*, the location server 300 may provide a location network 499 providing location services. Alternatively, a single device acting in the role of a station (STA) may do so (e.g., the location server 300 may directly emit wireless signals to provide the location network 499). A location provider 170*a* of the mobile device 100 may employ wireless signals emanating from the access points 494*a-c* to determine a current location of the mobile device 100 within the venue 409. The application server 500 may provide the mobile device 100 with a trusted location application 510 to cooperate with the location provider 170*a* to present information regarding items offered in the venue 409 based on the current location as determined by the location provider 170*a*. Provision of the trusted location application 510 may be via a network 999. The location provider 170*a* and the trusted location application 510 may establish trusted communications therebetween through a location manager 140 to enable an exchange of location information indicating the current information therebetween in a manner that prevents an untrusted location application 110 from receiving and/or making use of the location information. The credential server 700 may provide one or more of the mobile device 100, the location server 300 and the application server 500 with credentials to enable verification of the trustworthiness of at least the trusted location application 510 to enable establishment of the such trusted communications.

As depicted, subsets of these computing devices 100, 300, 500 and/or 700 exchange signals associated with determining a current location of the mobile device 100 within the venue 409 through one or both of the networks 499 and 999. However, one or more of these computing devices may exchange other data entirely unrelated to determining a current location of any computing device with each other and/or with still other computing devices (not shown) via one or both of the networks 499 and 999. In various embodiments, the location network 499 may be a wireless network extending within the interior of the venue 409. The network 499 may be configured to adhere to any of a variety of wireless networking specifications including and not limited to one or more of the 802.11 family of specifications promulgated by the Institute of Electrical and Electronics Engineers (IEEE) of New York, N.Y., USA, versions of the Bluetooth® specification promulgated by the Bluetooth® Special Interest Group (Bluetooth SIG) of Kirkland, Wash., USA, version of the Wi-Fi™ specification promulgated by the Wi-Fi™ Alliance of Austin, Tex., USA, and specification under development by the In-Location Alliance of Espoo, Finland. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the mobile device 100 incorporates one or more of a processor component 150, a storage 160, location providers 170*a* and 170*b*, controls 120, a display 180 and an interface 190 to couple the mobile device to one or both of the networks 499 and 999. The storage 160 stores one or more of the location manager 140, the trusted location application 510, location data 333, the untrusted location application 110, and competing data 133. The trusted location application 510 may incorporate credentials 537. The location providers 170*a* and 170*b* each incorporate a location engine 174*a* and 174*b*, and a location baseband 179*a* and 179*b*, respectively. Also, each of the location providers 170*a* and 170*b* may incorporate credentials 137, and/or the location provider 170*a* may additionally incorporate a location almanac 334.

As will be explained in greater detail, each of the location providers 170*a-b* may be made up of instructions executable by a processor component (e.g., the processor component 150), circuitry (whether programmable or not), or a combination thereof. In embodiments in which at least a portion of each of the location providers 170*a-b* incorporate at least some executable instructions (e.g., where the location engines 174*a-b* are made up of executable instructions), those portions may be stored in the storage 160. In embodiments in which at least a portion of each of the location providers 170*a-b* incorporate circuitry, one or both of the location providers 170*a-b* may each incorporate at least a portion of the interface 190, or of separate equivalent interfaces.

Regardless of the exact manner in which each of the location providers 170*a-b* may be implemented, each of the location providers 170*a-b* employs one or more of various techniques for determining a current location of the mobile device 100. It should also be noted that although two location providers, specifically the location providers 170*a-b*, are specifically depicted and discussed herein, embodiments are possible that incorporate other quantities of location providers. The quantity of location providers may be determined by the number and/or types of techniques for determining a current location of the mobile device 100 that are deemed desirable to support. By way of example, one location provider may employ wireless signals received from satellites (e.g., GPS or GNSS), another location provider may employ accelerometers and/or gyroscopes detecting movement, still another location provider may employ wireless signals received from cellular telephone communications towers, and yet another location provider may employ wireless signals received from access points disposed in the interior of a venue (e.g., the APs 494*a-c* of the venue 409). Further, two or more location providers may share data to enhance their operation (e.g., lowering power consumption and/or improving accuracy). By way of example, a location provider employing satellite signals (e.g., GPS or GNSS) may receive data from another location provider employing accelerometers and/or gyroscopes to provide greater accuracy (e.g., to filter out measurement errors).

The interface 190 may incorporate circuitry (e.g., demodulators, radio frequency signal amplifiers, etc.) to receive wireless signals employed by one or both of the location providers 170*a-b*. Each of the location basebands 179*a-b* may analyze characteristics of received wireless signals (e.g., time-of-flight, difference in time of arrival, relative skew, strength, direction/angle of arrival or departure, etc.) to derive raw data indicative of a current location. Each of the location engines 174*a-b* may convert the raw data into pieces of location information specifying a current location in a manner adhering to a widely used reference system (e.g., a coordinate system such as GPS coordinates or RSSI fingerprinting) for provision to one or more location applications (e.g., the location applications 110 and 510).

The location manager 140 incorporates a sequence of instructions operative on the processor component 150 in its role as a main processor component to implement logic to perform various functions. In executing the location manager 140, the processor component 150 receives requests from one or more location applications (e.g., the location applications 110 and 510) for location information indicating a current location of the mobile device 100, and receives location information from one or more location providers (e.g., the location providers 170*a-b*). The processor component 550 may distribute location information from one or more of the location providers to one or more of the location applications. In executing the location manager 140, the processor component 550 may distribute location information from one location provider to multiple location applications and/or may provide one location application with location information from multiple location providers.

In executing the location manager 140, the processor component 550 may also receive from a location application an indication of a location accuracy level required for any location information to be provided to the location application. For example, a location application to present weather forecasts for a current location of the mobile device 100 may require only a relatively low location accuracy such that specifying a current location of the mobile device 100 with an accuracy within one kilometer or several kilometers of its actual current location may be sufficient. However, a location application to present a current location of the mobile device 100 on a street map may require a somewhat greater location accuracy such that an ability to specify a current location of the mobile device 100 with an accuracy within several meters of its actual current location may be necessary.

In continuing to execute the location manager 140, the processor component 550 may further receive from a location provider an indication of a location accuracy level able to be provided by the location provider. For example, a location provider employing GPS satellite signals may be able to provide location information with a location accuracy level high enough that a current location of the mobile device 100 may be specified to within a few meters of its actual current location. Such a location accuracy level may be more than sufficient for use in presenting a weather prediction for a current location or presenting an indication of a current location on a street map. However, such a location accuracy level may not be sufficient for use in presenting a current location of the mobile device 100 among rooms, hallways, aisles, etc. of an interior of a venue (e.g., the venue 409).

The processor component 550 may selectively distribute location information received from different location providers with different degrees of location accuracy to location applications based on their requested degrees of location accuracy. Further, the processor component 550 may selectively distribute location information received from different location providers to different location applications based on which location provider(s) are able to provide location information at any given time. As familiar to those skilled in the art, different ones of wireless signals from satellites, cellular towers and/or APs of wireless networks may be available at different times in different places. By way of example, entry into a structure (e.g., a house or building) may block receipt of wireless signals from satellites.

Each of the location applications 110 and 510 incorporates a sequence of instructions operative on the processor component 150 in its role as a main processor component to implement logic to perform various functions. In executing each of the location applications 110 and 510, the processor component 150 may use location information distributed to each of the location applications 110 and 510 by the location manager 140 to perform a function based on a current location of the mobile device 100 indicated in such location information. To maintain the trusted nature of the trusted location application 510, the processor component 150 may execute the trusted location application 510 in a secure mode and/or with various restrictions in access to a portion of the storage 160 in which the trusted location application 510 is stored (e.g., "sandboxing" or a "secure enclave").

The trusted location application 510 may be associated with the venue 409. In executing the trusted location application 510, the processor component 550 may visually present on the display 180 (e.g., with a visually presented map) an indication of a current location of the mobile device 100 among hallways, rooms, aisles, shelves, kiosks, information desks, restrooms, check-out counters, etc. of the venue 409. The processor component 550 may present information to the user concerning items offered (e.g., offered for sale, rent, etc.) within the venue 409, their location with the venue 409, and/or various promotions (e.g., sales, discounts, coupons, etc.) associated with those items.

In executing the trusted location application 510, the processor component 550 may monitor movements of the mobile device 100 (as indicated in the location information it receives) as the user moves about the interior of the venue 409 while carrying the mobile device 100. Instances of the user stopping and/or seeming to linger at specific locations within the venue 409 may be deemed to be indications of the user being interested in one or more items located at those specific locations. In response, the processor component 550 may visually present various promotions associated with those items at those specific locations (e.g., to encourage the user to rent, purchase or otherwise make use of one of those items).

The user of the mobile device 100 may obtain the trusted location application 510 from the application server 500. More specifically, the user may have operated the mobile device (e.g., via the controls 120 and the display 180) to access the application server 500 via the network 999, download the trusted location application 510 therefrom, and store it within the storage 160. The user may have chosen to do so due to benefits arising from the convenience of being able to use the trusted location application 510 to find items within the venue 409 and/or to be informed of promotions associated with those items.

The untrusted location application 110 may be associated with a competitor of whatever commercial, governmental or non-profit entity may be associated with the venue 409. The user of the mobile device 100 may be a patron of both the venue 409 and a competing venue associated with the competitor, and may therefore choose to download the untrusted location application 110 in addition to trusted location application 510 to make use of benefits offered by the untrusted location application 110 that may be similar to those offered by the trusted location application 510.

However, in executing the untrusted location application 110, the processor component 550 may be caused to do more than to simply provide the benefits that induced the user to download the untrusted location application (e.g., being guided through the competing venue). In executing the untrusted location application 110, the processor component 550 may attempt to employ the same location information intended to be employed in execution of the trusted location application 510 by the processor component 550. More specifically, the processor component 550 may be caused by its execution of the untrusted location application 110 to use the location information generated by the location provider **170*a* and indicating the location of the mobile device 100 within the venue 409** to select and present competing promotions of similar items available at the competing venue.

In various embodiments, the application server 500 incorporates one or more of a processor component 550, a storage 560, and an interface 590 to couple the application server 500 to at least the network 999. The storage 560 stores one or more of a control routine 540 and the trusted location application 510. Again, the trusted location application 510 may incorporate the credentials 537. The control routine 540 incorporates a sequence of instructions operative on the processor component 550 in its role as a main processor component to implement logic to perform various functions. In executing the control routine 540, the processor component 550 may receive a signal from the mobile device 100 via the network 999 to provide the trusted location application 510 to the mobile device 100. In response, the processor component 550 may so provide the trusted location application to the mobile device 100.

The application server 500 may be associated with the entity associated with the venue 409 such that the untrusted location application 110 may have been downloaded from a server unassociated with that entity. Alternatively, the server 500 may be associated with an entirely different entity offering a variety of location applications associated with a variety of different venues for download, including both of the location applications 110 and 510.

In various embodiments, the location server 300 incorporates one or more of a processor component 350, a storage 360, and an interface 390 to couple the location server 300 to at least the location network 499. The storage 360 stores one or more of a control routine 340, a location almanac 334, a location data 333 and credentials 337. As previously discussed, the location server 300 is coupled to the APs **494*a-c* by and to form the location network 499. Upon being carried by a user to the venue 409, the mobile device 100 may also become coupled to the location network 499**.

The control routine 340 incorporates a sequence of instructions operative on the processor component 350 in its role as a main processor component to implement logic to perform various functions. In executing the control routine 340, the processor component 350 may receive a signal from one or more of the APs 494*a-c* indicating that the mobile device 100 has been coupled to the location network 499. In response, the processor component 350 may provide the location almanac 334 and the location data 333 to at least one of the APs 494*a-c* to transmit to the mobile device 100.

Figure 2:
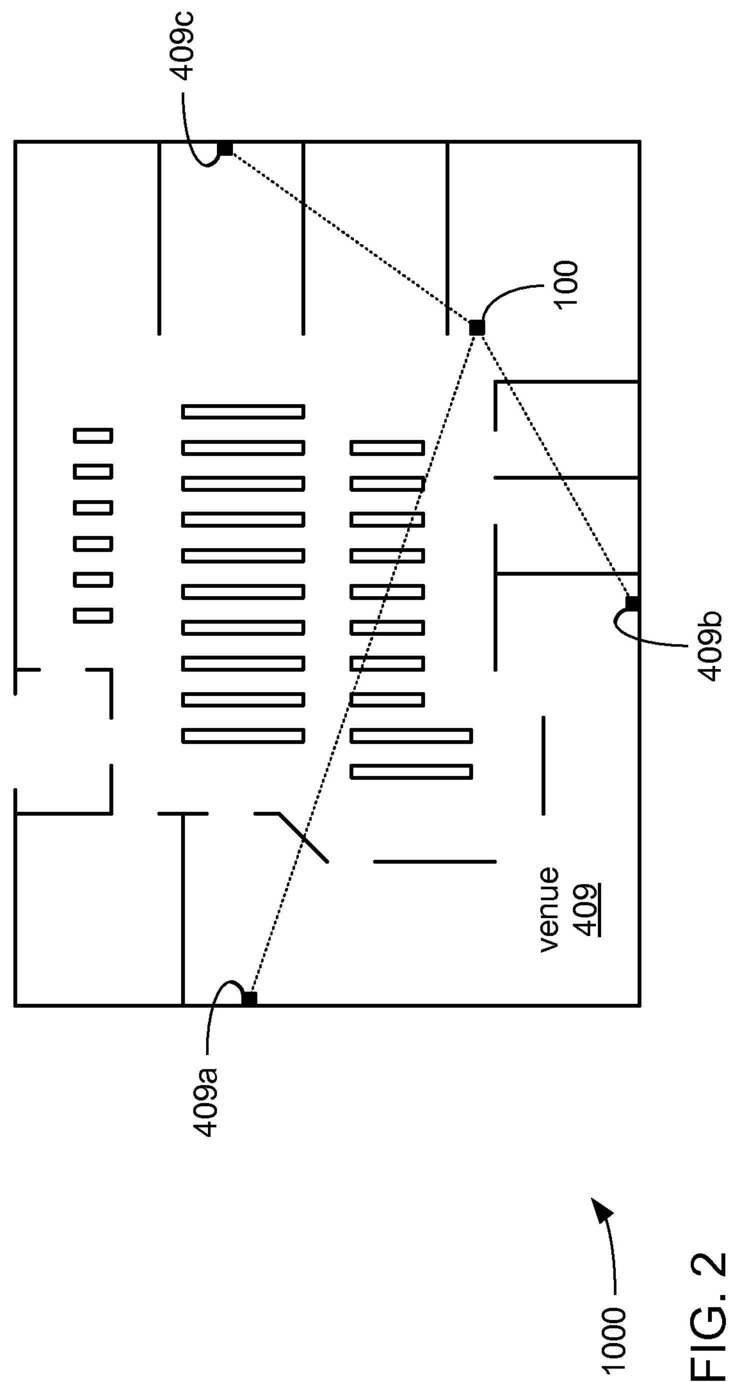
FIG. 2 illustrates an example of a venue in which an embodiment is disposed.

The location almanac 334 provides indications of locations and/or various characteristics of the APs 494*a-c* to enable the location provider 170*a* to analyze wireless signals transmitted by the APs 494*a-c* to determine the location of the mobile device 100 within the interior of the venue 409. FIG. 2 depicts an example floor plan of the venue 409, including locations of each of the APs 494*a-c* relative to walls, doorways, aisles and check-out counters within the venue 409. The provision of the location almanac 334 enables the location provider 170*a* to employ strength, direction and/or timing features (e.g., skew between portions of signals, time-in-flight, difference in time of arrival, angle arrival or departure, etc.) of signals transmitted by each of the APs 494*a-c* to triangulate the location of the mobile device 100 relative to the APs 494*a-c*. In essence, the location almanac 334 "teaches" the location provider 170*a* (specifically, the location baseband 179*a* thereof), which may be usable with any number of location networks, how to be a location provider configured specifically to work with the location network 499.

In determining a current location of the mobile device 100 relative to the APs 494*a-c*, the location provider 170*a* thereby determines a current location of the mobile device 100 within the venue 409, and relative to rooms, hallways, aisles, shelves, etc. therein. It should be noted that although a quantity of three of the APs 494*a-c* are depicted and discussed herein, other embodiments are possible having fewer or more APs. The quantity of APs incorporated into an embodiment may be partially dependent upon numerous factors, including and not limited to, techniques used to determine a location from signals transmitted by APs, and the transmission range of each AP versus the size of the venue in which they are used.

Returning to FIG. 1, the location data 333 may provide indications of locations of walls, doorways, aisles, shelves, check-out counters, etc. that define the floor plan of the venue 409. Such information could be used by the trusted location application 510 to visually present the current location of the mobile device 100 on a map of the interior of the venue 409 on the display 180. The location data 333 may also provide indications of items available within the venue 409, their locations therein, and/or current promotions associated with them. The provision of the location data 333 enables the trusted location application 510 to present indications of locations of items and current promotions to the user. The provision of the location data 333 also enable the processor component 150, in executing the trusted location application 510, to determine what items offered within the venue 409 may be of interest to the user from aspects of the manner in which the user moves through the venue 409. By way of example, where the user momentarily stops at a location of a particular item, the location data 333 enables the processor component 150 to correlate that location with that item, and then present the user with an indication of a promotion associated with that item.

Unfortunately, and as previously explained, execution of the location manager 140 by the processor component 150 may result in the location information generated by the location provider 170*a* and indicating the current location of the mobile device 100 within the venue 409 being used by the untrusted location application 110, as well as the trusted location application 510. It may be that a person associated with the competitor that is associated with the untrusted location application 110 may tour the interior of the venue 409 to record the locations of various items throughout the venue 409. What that person records may then be incorporated into the competing data 133 provided to the mobile device 100 along with the untrusted location application 110, thereby providing a correlation of items within the venue 409 with their locations within the venue 409 that may be similar to the correlation provided by the location data 333. The competing data 133 may also include information concerning promotions at the competing venue for items similar to what may be available at the venue 409.

In executing the untrusted location application 110, the processor component 550 may employ both the location information intended for the trusted location application 510 and the competing data 133 to disrupt the presentation of information related to items found within the venue 409 with a competing presentation of information related to items at the competing venue. In essence, as the user moves about within the venue 409, competing presentations are made to the user under the control of both of the location applications 510 and 110. In response to indications in their movement of possible interest in an item within the venue 409, both of the location data 333 and the competing data 133 are employed in correlating a location with what the item of interest may be, and competing presentations of promotions associated with that item of interest are made. In essence, the investment in infrastructure made to provide the location network 499 within the venue 409 is used both for and against the entity associated with the venue 409 that made the investment.

In an effort to prevent such dueling presentations, one or more location providers of the mobile device 100 (e.g., one or both of the location providers 170*a-b*) are configured to be capable of establishing trusted communications with trusted location applications (e.g., the trusted location application 510) by which location information is provided only to selected one(s) of those trusted location applications. To enable establishment of such trusted communications, one or more location providers of the mobile device (e.g., one or both of the location providers 170*a-b*) are configured to verify the trustworthiness of a trusted location application. As familiar to those skilled in the art, verification of trustworthiness of one component of a computing device by another component of a computing device may be performed in any of a variety of ways.

As has been discussed, one or more of the credentials 137, 337 and 537 may be incorporated into one or more of the location providers 170*a* and/or 170*b*, the location server 300 and the trusted location application 510. Each of the credentials 137, 337 and 537 may be provided by the credential server 700 and/or other computing devices associated with one or more credentialing authorities accepted by a manufacturer of the mobile device 100, a purveyor of the location providers 170*a-b*, a purveyor of the trusted location application 510 and/or the entity associated with the venue 409. Each of the credentials 137, 337 and 537 may be generated in a manner employing any of a variety of security credential generation algorithms known to those skilled in the art, including any of a variety of public-private key generation techniques.

One or more of the credentials 137, 337 and 537 may be employed in verifying the trustworthiness of at least the trusted location application 510 as a location application that is associated with the venue 409 and/or with the entity associated with the venue. By way of example, the credentials 537 may include a key, and the key may be directly incorporated into the trusted location application 510 or the trusted location application 510 may be digitally signed with the key. Also, the credentials 537 may include a key related to the key of the credentials 537. The location provider **170*a* may receive the credentials 337 from the location server 300 through one of the APs 494*a-c* upon the coupling of the mobile device 100 to the location network 499, and the location provider 170*a* may use the key of the credentials 337 to verify the trustworthiness of the trusted location application 510. Such verification may be performed by verifying a signature generated by the trusted location application 510 using the key of the credentials 537 embedded within it, or by directly verifying at least a portion of the trusted location application 510 where the trusted location application 510 is itself a digital signature. The location provider 170*a* may then signal the location server 300 via the location network 499** with an indication of the results of the verification.

As an alternate example, the processor component 350 may itself, through its execution of the control routine 340, perform the verification of the trustworthiness of the trusted location application 510. To maintain the trusted nature of the control routine 340 in performing such verification, the processor component 350 may execute the control routine 340 in a secure mode and/or with various restrictions in access to a portion of the storage 360 in which the control routine 340 is stored (e.g., "sandboxing" or a "secure enclave"). The processor component 350 may request that the location provider **170*a* provide the location server 300 with either a digital signature generated by the trusted location application 510 using a key of the credentials 537, or at least a portion of the trusted location application 510 where the trusted location application 510 is itself digitally signed with such a key. The processor component 350 may then signal the location provider 170*a*** with an indication of the results of the verification.

The processor component 350 may condition the provision of one or both of the location almanac 334 and the location data 333 to the mobile device 100 on the results of the verification of the trustworthiness of the trusted location application 510. Alternatively or additionally, the location provider **170*a* may condition the provision of location information associated with the location services provided by the location network 499 at the venue 409 to the trusted location application 510 on the results of the verification of the trusted location application 510**.

In some embodiments, the location providers **170*a-b* may each be configured and/or incorporated into the mobile device 100 in a manner substantially prevents and/or renders difficult efforts to compromise the integrity of either. Executable instructions making up one or both of the location providers 170*a-b* may be stored in a non-volatile portion of the storage 160 in a manner that substantially prevents being overwritten in manner that compromises their integrity. It may be that the location providers 170*a-b* are loaded into such a non-volatile portion of the storage 160 by the corporate or other entity that manufactures the mobile device 100. Alternatively or additionally, one or more of the location providers 170*a-b* may be implemented with circuitry and/or a processor component sufficiently separate from the processor component 150 as to substantially preclude being overwritten or otherwise interfered with by any malicious code that may be executed by the processor component 150. Thus, in some embodiments, a presumption may be made that the location providers 170*a-b* are trustworthy such that the location providers 170*a-b* are trusted to perform the aforedescribed verification of the trusted location application 510** without themselves being verified.

However, in other embodiments, the processor component 350 of the server 300, in executing the control routine 340, may verify the trustworthiness of one or both of the location providers **170*a-b*. To enable such verification, one or both of the location providers 170*a-b* may be provided with the credentials 137. The credentials 137 may be embedded in a portion of executable instructions of one or both of the location providers 170*a-b* (e.g., the location engine 174*a* and/or 174*b*), or may be otherwise stored within the location providers 170*a-b*. Alternatively, the credentials 137 may include a key or one or both of a component of the location providers 170*a-b* may be digitally signed with such a key. In verifying one or both of the location providers 170*a-b*, the processor component 350 may request that one or both of the location providers 170*a-b* provide the location server 300 with the credentials 137 or a derivative of a key thereof (e.g., a digital signature generated with such a key). The processor component 350 may then signal the location provider 170*a* with an indication of the results of the verification of the trustworthiness of one or both of the location providers 170*a-b*, and/or may condition provision of one or both of the location almanac 334 and the location data 333 to the mobile device 100** on those results.

Upon successful verification of one or both of the location provider **170*a* and the trusted location application 510 such that both are assumed and/or deemed proven to be trustworthy. Stated differently, upon verification of the trustworthiness of one or both of the location provider 170*a* and the trusted location application 510, a level of trust is established among the location server 300, the location provider 170*a* and the trusted location application 510. With this level of trust established, the location provider 170*a* and the trusted location application 510 establish trusted communications therebetween through the location manager 140** to enable a secure exchange of location information.

Such trusted communications may be established by one or both of the location provider **170*a* and the trusted location application 510 signaling the location manager 140 with a request to convey location information generated by the location provider 170*a* only to the trusted location application 510, and not to any other location application including the untrusted location application 110. However, as previously discussed, the OS of which the location manager 140 may be a component may be compromised such that the location manager 140 may not route such location information solely to the trusted location application 510. It may be that the location manager 140, along with the rest of the OS, is relatively easily supplanted or entirely replaceable, unlike the location providers 170*a-b***.

Thus, as an alternative to or in addition to making such a request of the location manager 140, such trusted communications may be established by the location provider **170*a* encrypting the location data it sends to the trusted location application 510, and the trusted location application 510 decrypting it. With such use of encryption, no other location application, including the untrusted location application 110, is able to make use of the location information, even if the location manager 140 ignores the request to provide it only to the trusted location application 510. To enable such use of encryption, the credentials 337 and 537 may include related keys for use in the encryption and decryption, respectively, of such location information. Further, those keys may be the same keys employed in verifying the trustworthiness of the trusted location application 510**.

Figure 3:
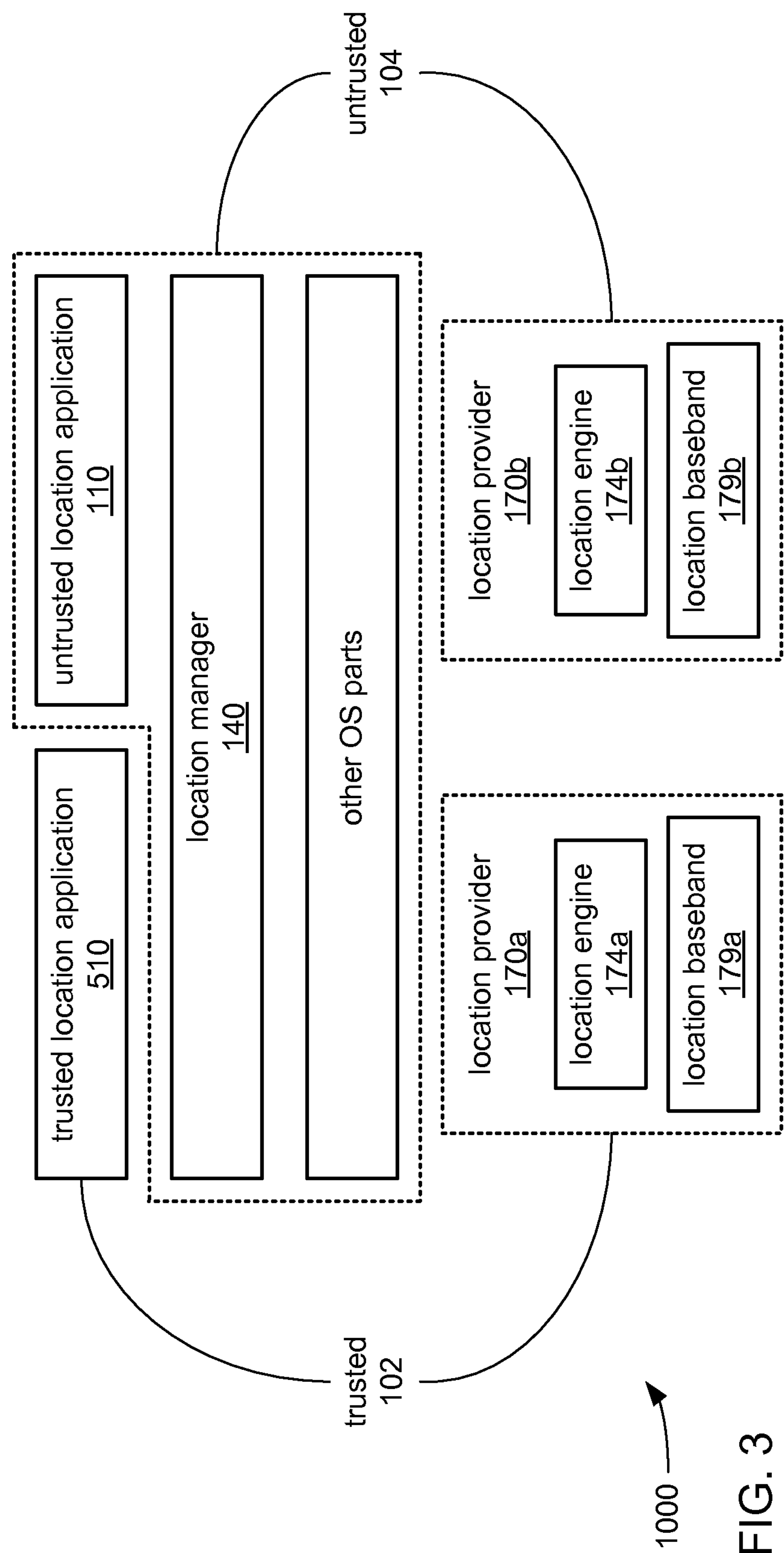
FIGS. 3-4 illustrates conveyance of location information according to an embodiment.
Figure 4:
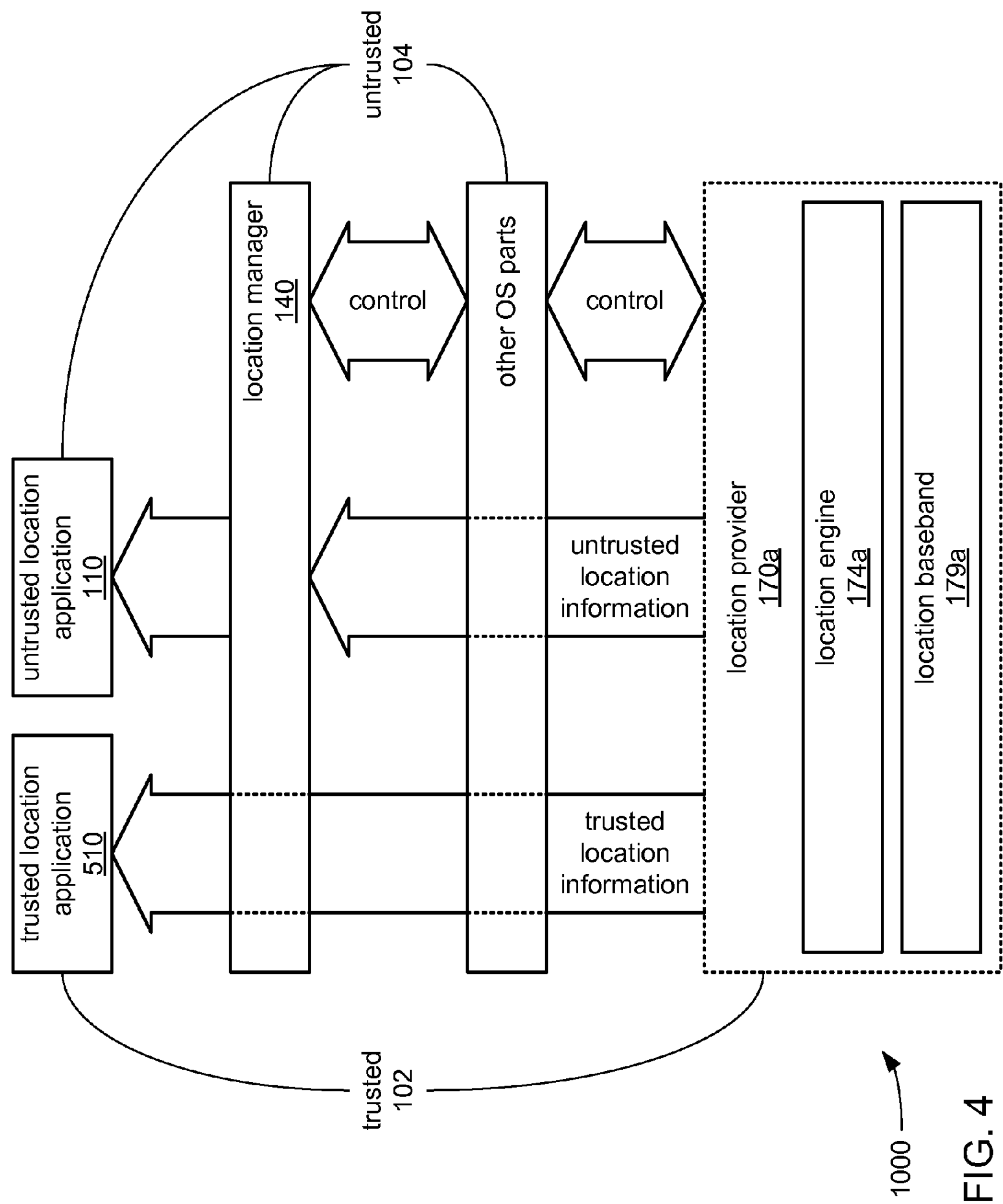

FIGS. 3 and 4, taken together, illustrate an example embodiment of trusted communications between the location provider **170*a* and the trusted location application 510. As previously discussed, the location manager 140 may be a component of an OS executed by the processor component 150. Again, it is not uncommon for an OS to be compromised by malicious code (e.g., a virus, worm, etc.) such that an OS of the mobile device 100 may be deemed untrustworthy. Thus, in establishing secure communications between the location provider 170***a* and the trusted location application 510, the location manager 140 and other components of the OS of the mobile device 100 are deemed to be untrustworthy components 104, along with the untrusted location application 110 and the location provider 170*b*. It may be that only the location provider 170*a* and the trusted location application 510 are deemed to be trustworthy components 102 for purposes of exchanging location information indicating a current location within the venue 409.

However, as also previously discussed, the location manager 140 may be interposed between the location provider 170*a* and the trusted location application 510 such that location information must be exchanged from the location provider 170*a* to the trusted location application 510 through the location manager 140. Further, there may be other parts of that OS through which such exchanges of such location information must be made. By way of example, the OS could include a hardware abstraction layer (HAL) through which the location manager 140 and at least the location provider 170*a* interact. As familiar to those skilled in the art, portions of an OS may be made usable across multiple different computing devices (also known as being made "portable") through the use of a unique HAL for each computing device that provides a consistent interface that separates those portions of the OS from various device-specific aspects of each of those different computing devices. Thus, there may be multiple untrusted components 104 interposed between the trusted components 102.

As more specifically depicted in FIG. 4, the location manager 140 may be signaled by one of the trusted components 102 (e.g., the location provider 170*a* or the trusted location application 510) to convey the location information generated by the location provider 170*a* only to the trusted location application 510. If the location manager 140 is not compromised, then the location manager 140 may comply with that request, and thus, such trusted location information may be conveyed only to the trusted location application 510. However, if the location manager 140 is compromised, then establishment of trusted communications between the location provider 170*a* and the trusted location application 510 may entail encrypting such trusted location information such that the untrusted location application 110 is unable to use it, even if provided by the location manager 140.

As previously discussed, the location provider 170*a* is not associated with the entity associated with the venue 409, except during the time when the mobile device 100 is carried within the venue 409 such that the location provider 170*a* is used to determine the current location of the mobile device 100 within the venue 409. Thus, at other times during which the mobile device 100 is not carried within the venue 409, including times during which the mobile device 100 is carried into the competing venue associated with the entity associated with the untrusted location application 110, the location provider 170*a* may be employed to generate location information for location applications other than the trusted location application 510, including the untrusted location application 110.

In various embodiments, each of the processor components 150, 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
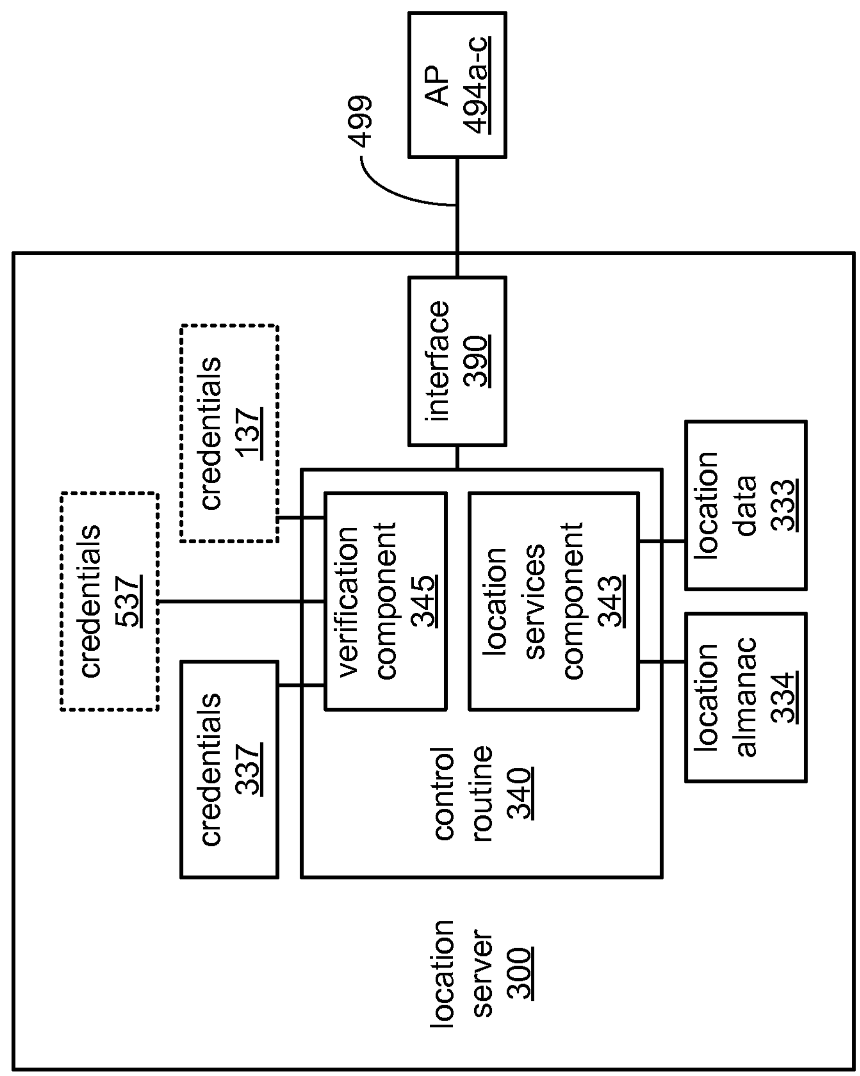
FIGS. 5-7 each illustrate a portion of an embodiment of a location system.
Figure 6:
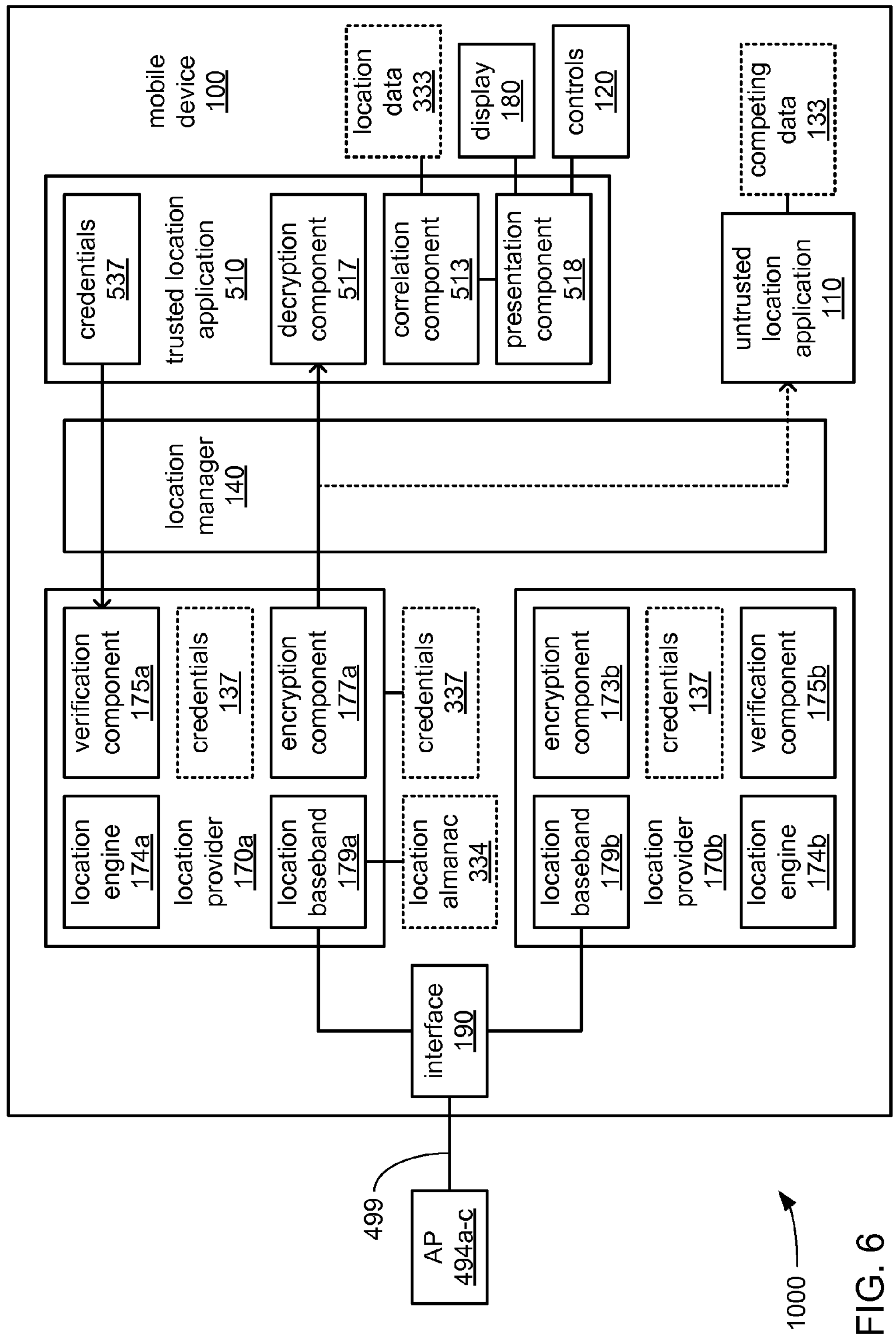
Figure 7:
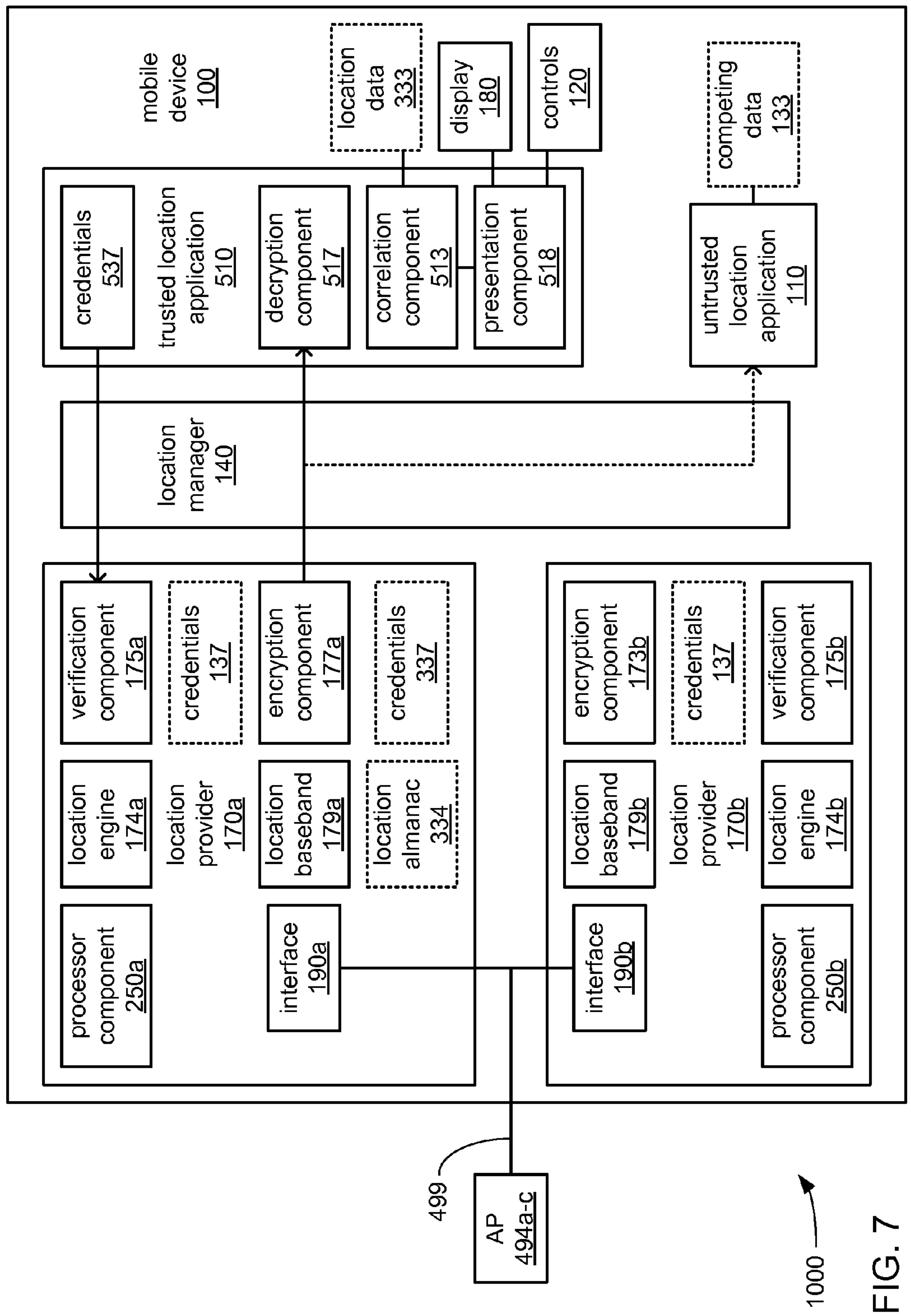

FIGS. 5, 6 and 7 each illustrate a block diagram of a portion of an embodiment of the location system 1000 of FIG. 1 in greater detail. More specifically, FIG. 5 depicts aspects of the operating environment of the location server 300 in which the processor component 350, in executing the control routine 340, cooperates with the APs 494*a-c* to provide location services to mobile devices (e.g., the mobile device 100). FIG. 6 depicts aspects of the operating environment of an embodiment of the mobile device 100 in which the processor component 150, in executing one or more of the location provider 170*a* and/or 170*b*, the location manager 140 and/or the trusted location application 510, correlates locations in a venue (e.g., the venue 409) items offered therein, and presents related information to a user. FIG. 7 depicts aspects of the operating environment of an alternate embodiment of the mobile device 100 in which various processor components 150, 250*a* and 250*b*, in separately executing one or more of the location provider 170*a* and/or 170*b*, the location manager 140 and/or the trusted location application 510 to perform the same functions as the embodiment of FIG. 6. As recognizable to those skilled in the art, the control routine 340, executable portions of the location providers 170*a* and/or 170*b*, the location manager 140 and the trusted location application 510, including the components of which each is composed, are selected to be operative on whatever type of processor or processors that are selected to implement corresponding ones of the processor components 150, 250*a*, 250*b* and 350.

Turning more specifically to FIG. 5, the control routine 340 may include location services component 343 to operate the interface 390 to transmit one or both of the location almanac 334 and the location data 333 to at least one of the APs 494*a-c* to, in turn, transmit one or both of the almanac 334 and the location data 333 to a mobile device (e.g., the mobile device 100). In so doing, the location services component enables a mobile device to determine its current position within the venue 409 by analyzing signals transmitted to it by the APs 494*a-c* and to correlate items offered within the venue (e.g., offered for sale, rent, etc.) with the locations of those items within the venue 409.

The control routine 340 may include a verification component 345 to at least assist in verification of a trusted location application of a mobile device (e.g., the trusted location application 510 of the mobile device 100). As has been discussed, the verification component 345 may request credentials of a location provider of a mobile device (e.g., the location provider 170*a* of the mobile device 100) and use those credentials along with the credentials 337 to verify that location provider. The verification component 345 may request credentials of a trusted location application of a mobile device (e.g., the trusted location application 510 of the mobile device 100) and use those credentials along with the credentials 337 to verify that trusted location application. The verification component 345 may provide the credentials 337 to a mobile device to enable a location provider of that mobile device (e.g., the location provider 170*a* of the mobile device 100) to verify a trusted location application of that mobile device (e.g., the trusted location application 510). The verification component 345 may use the results of one or more of such verifications to determine whether or not to permit transmission of one or more of the credentials 337, the location almanac 334 or the location data 333 to that mobile device.

Turning more specifically to FIG. 6, each of the location providers 170*a* and 170*b* may include a verification component 175*a* or 175*b*, respectively, to verify a trusted location application stored within the mobile device 100 (e.g., the trusted location application 510 stored within the storage 160). As has been discussed, the verification component 175*a* or 175*b* may receive credentials to be employed in such verification from a location network of a venue associated with that trusted location application (e.g., the credentials 337 received from the location network 499, which is associated with the trusted location application 510). The verification component 175*a* or 175*b* may request credentials from the trusted location application and employ those credentials, along with the credentials received from the location network, to perform verification of that trusted location application. The verification component 175*a* or 175*b* may use the results of the verification to determine whether or not to permit the conveying of location information indicating a current location of the mobile device in a venue to that trusted location application.

Each of the location providers 170*a* and 170*b* may include an encryption component 177*a* or 177*b*, respectively, to encrypt location data indicating a current location of the mobile device 100 within a venue (e.g., the venue 409) before its conveyance to a trusted location application (e.g., the trusted location application 510) through the location manager 140. As has been previously explained, it is envisioned that the location providers 170*a-b*, the location manager 140 and any location applications (whether trusted or untrusted) may be provided from different sources. As has also been explained, although the location providers 170*a-b* may be assumed to be trustworthy, and one or more of the location applications may be verified as trustworthy, the typical architecture of mobile devices resulting in the location manager 140 being a component of an OS may make the trustworthiness of the location manager 140 questionable. Thus, although the location manager 140 may be signaled with a request to route location information from one or the other of the location providers 170*a* or 170*b* to only one trusted location application, such location information may be encrypted to address the possibility of the location manager 140 not honoring such a request.

Turning more specifically to FIG. 7., the operating environment of the alternate embodiment of the mobile device 100 of FIG. 7 is substantially similar in numerous ways to the operating environment of the embodiment of FIG. 6. Therefore, for sake of simplicity of discussion and understanding, substantially similar components have been given the same reference numbers.

The embodiment of FIG. 7 differs from the embodiment of FIG. 6 in that each of the location providers 170*a* and 170*b* are implemented with separate processor components 250*a* and 250*b*, respectively. The processor components 250*a* and 250*b* operate entirely independent of each other and/or of the processor component 150. As previously explained, the trustworthiness of each of the location providers 170*a* and 170*b* may be assumed as a result of each being configured to be sufficiently isolated from the operation of the processor component 150 as to make compromising the integrity of one or both of the location providers 170*a* and 170*b* substantially difficult. The provision of each of the location providers 170*a* and 170*b* with an independent processor component 250*a* and 250*b*, respectively, may be part of measures taken to provide such sufficient isolation.

The embodiment of FIG. 7 also differs from the embodiment of FIG. 6 in that each of the location providers 170*a* and 170*b* are implemented with separate ones of interfaces 190*a* and 190*b*, respectively, instead of sharing a single interface 190 as depicted in FIG. 6. Each of the location providers 170*a* and 170*b* may employ sufficiently different technologies (e.g., receive wireless signals of sufficiently different frequency and/or other characteristic) as to necessitate and/or make practical the provision of entirely separate interface components (e.g., demodulators, radio frequency amplifiers, etc.). Further, as has been discussed, significant portions of each of the location providers 170*a* and 170*b* may be implemented with circuitry, and it may be deemed desirable to include a separate interface in such circuitry for each.

Figure 8:
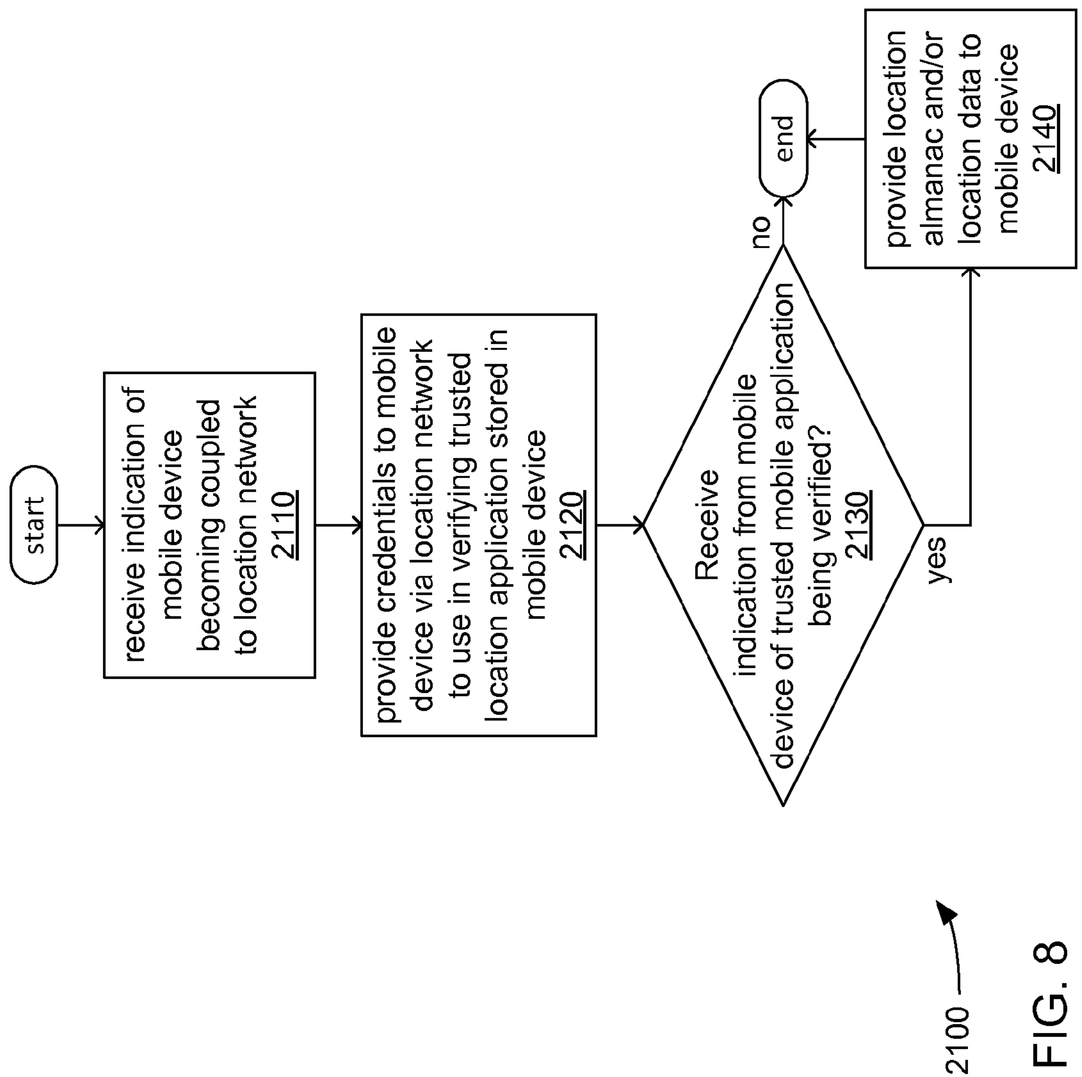
FIGS. 8-10 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the location server 300.

At 2110, a processor component of a location server coupled to a location network providing location services and associated with a venue (e.g., the processor component 350 of the location server 300 coupled to the location network 499 of the venue 409) receives an indication of a mobile device becoming coupled to the location network (e.g., the mobile device 100). As previously discussed, the location network 409 is made up, at least in part, by multiple APs (e.g., the APs 494*a-c*) transmitting signals that enable a location provider of the mobile device (e.g., the location provider 170*a*) to determine the location of the mobile device within the venue 409.

At 2120, in response to receipt of the signal, credentials are provided to the mobile device to be used by a portion of its location provider (e.g., the verification component 175*a*) to verify the trustworthiness of a trusted location application associated with the venue (e.g., the location application 510). As previously discussed, both the server 300 and the trusted location application 510 are provided with credentials (e.g., the credentials 337 and 537, respectively) that are related such that both credentials may be used together to verify the trusted location application. As also discussed, the credentials of the trusted location application may be embedded therein or the trusted location application may be digitally signed with its associated credentials. Thus, the particular credentials provided to the location provider to perform verification may be a portion of the trusted location application itself and/or may be a signature generated by the trusted location application using its associated credentials.

At 2130, the location server receives an indication of the results of the verification of the trusted location application via the location network. If, at 2130, the results indicate that the trusted location application has been verified, then a location almanac and/or location data are transmitted to the mobile device via the location network. As previously explained, the location almanac provides indications of the locations of each AP of the location network in the venue, and one or more characteristics of each AP to effectively "teach" the location provider how to determine the location of the mobile device within the venue.

Figure 9:
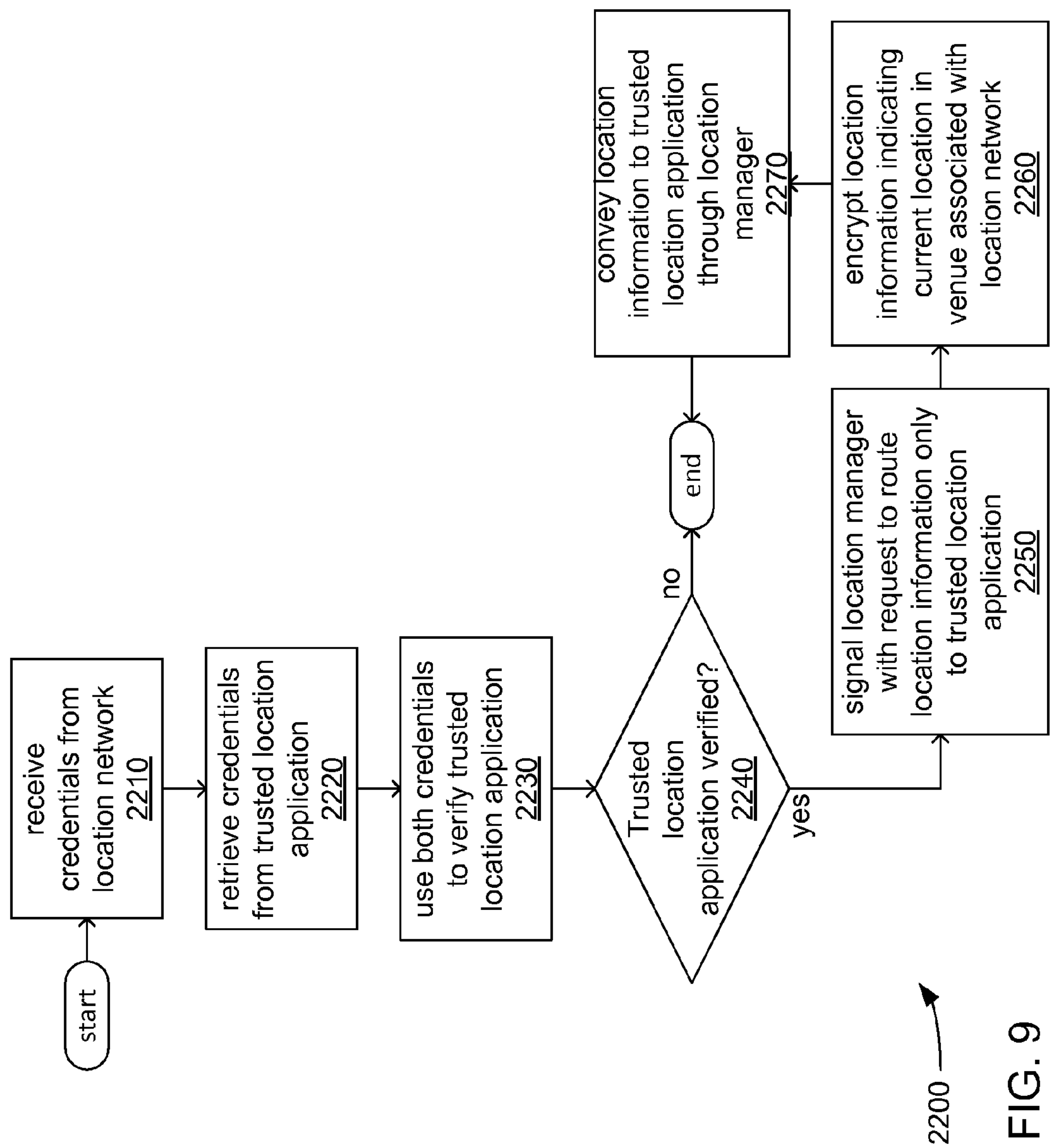

FIG. 9 illustrates one embodiment of a logic flow 2200. The logic flow 2200 may be representative of some or all of the operations executed by one or more embodiments described herein. More specifically, the logic flow 2200 may illustrate operations performed by either the processor component 150 or 250*a* in executing one or more executable portions of the location provider 170*a*, and/or performed by other component(s) of the mobile device 100.

At 2210, a processor component of a mobile device that has become coupled to a location network of a venue (e.g., the processor component 150 or 250*a* of the mobile device 100 becoming coupled to the location network 499 of the venue 409) computing device 300 of the map merging system 1000) receives credentials from the location network for use in verifying the trustworthiness of a trusted location application (e.g., the trusted location application 510). At 2220, the processor component also retrieves credentials from the trusted location application to be verified. Again, as previously discussed, the credentials from the location network and associated with the trusted location application are generated such that they are related to enable their use together to verify the trusted location application.

At 2230, both credentials are so used, and a check is made of the results at 2240. If, at 2240, the trusted location application has been so verified, then a location manager is signaled with a request to route location information generated by the location provider only to the trusted location application at 2250. However, as previously discussed, the location manager may have been compromised such that it does not honor this request.

In response to the possibility of the location manager being so compromised, the location information is encrypted at 2260 by the location provider before it is conveyed to the trusted location application through the location manager at 2270. As has been discussed, the key used by the location provider to encrypt the location information may be received from the location network (e.g., provided by a location server associated with the location network). Also, both the key used by the location provider to encrypt the location information may be incorporated into the credentials received from the location network and the key used by the trusted location application to decrypt it may be incorporated into the credentials associated with the trusted location application.

Figure 10:
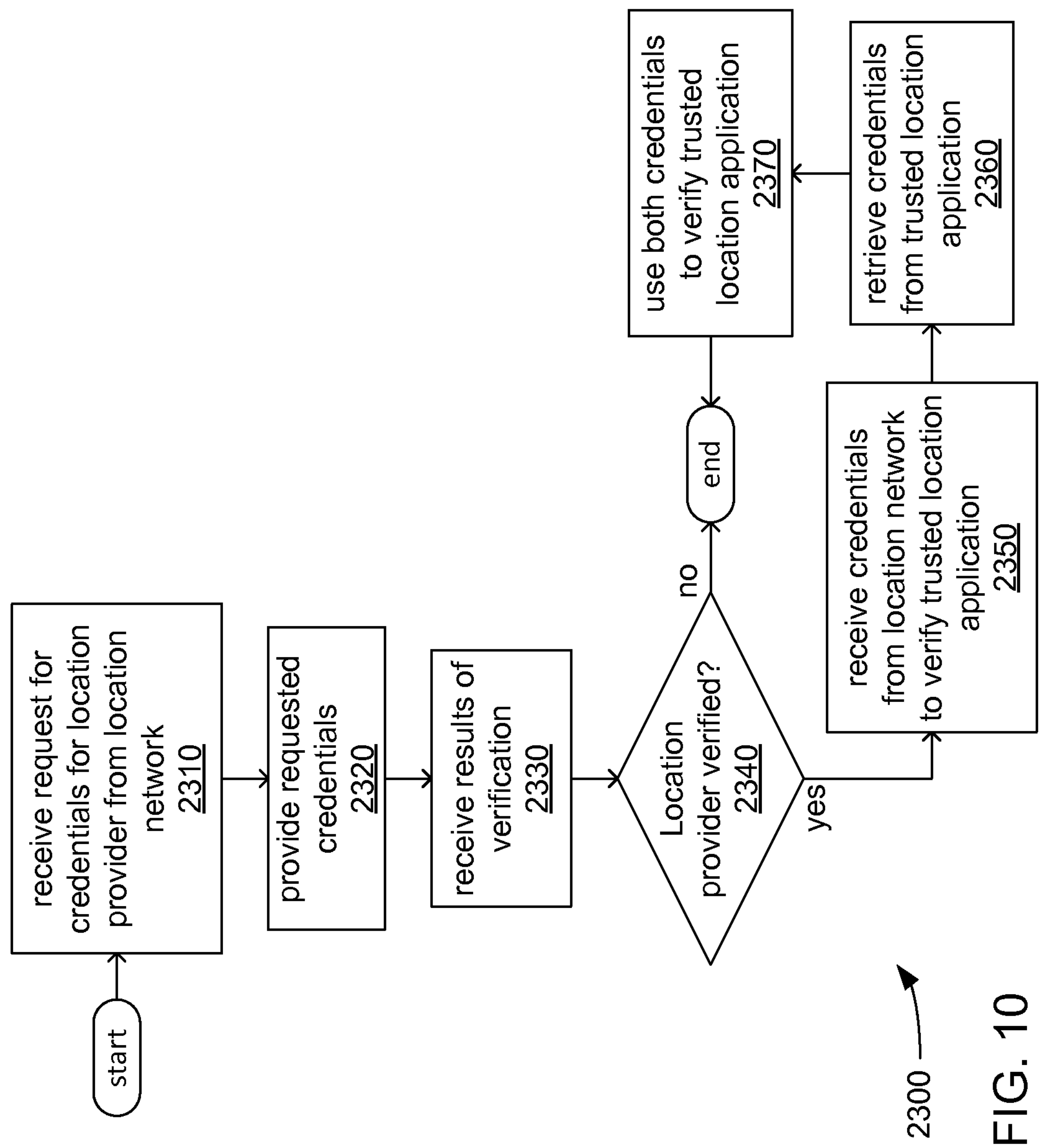

FIG. 10 illustrates one embodiment of a logic flow 2300. The logic flow 2300 may be representative of some or all of the operations executed by one or more embodiments described herein. More specifically, the logic flow 2200 may illustrate operations performed by either the processor component 150 or 250*a* in executing one or more executable portions of the location provider 170*a*, and/or performed by other component(s) of the mobile device 100.

At 2310, a processor component of a mobile device that has become coupled to a location network of a venue (e.g., the processor component 150 or 250*a* of the mobile device 100 becoming coupled to the location network 499 of the venue 409) computing device 300 of the map merging system 1000) receives a request for credentials from the location network. The processor component complies with the request, transmitting the requested credential onto the location network at 2320. As has been discussed, a location server associated with a location network (e.g., the location server 300 coupled to the location network 499) may request credentials to verify the trustworthiness of the location provider used by a mobile device with that location network (e.g., the location provider 170*a* used with the location network 499).

At 2330, the mobile device receives the results of the verification of its location provider. If the location provider has been verified at 2340, then the mobile device receives credentials from the location network for use by the location provider in verifying the trustworthiness of a trusted location application associated with the venue of the location network and stored within the mobile device (e.g., the trusted location application 510 stored within the storage 160).

At 2360, the credentials of the trusted location application are retrieved for use by the location provider in verifying the trusted location application. At 2370, the credentials received from the location network and retrieved from the trusted location application are used by the location provider to verify the trusted location application.

Figure 11:
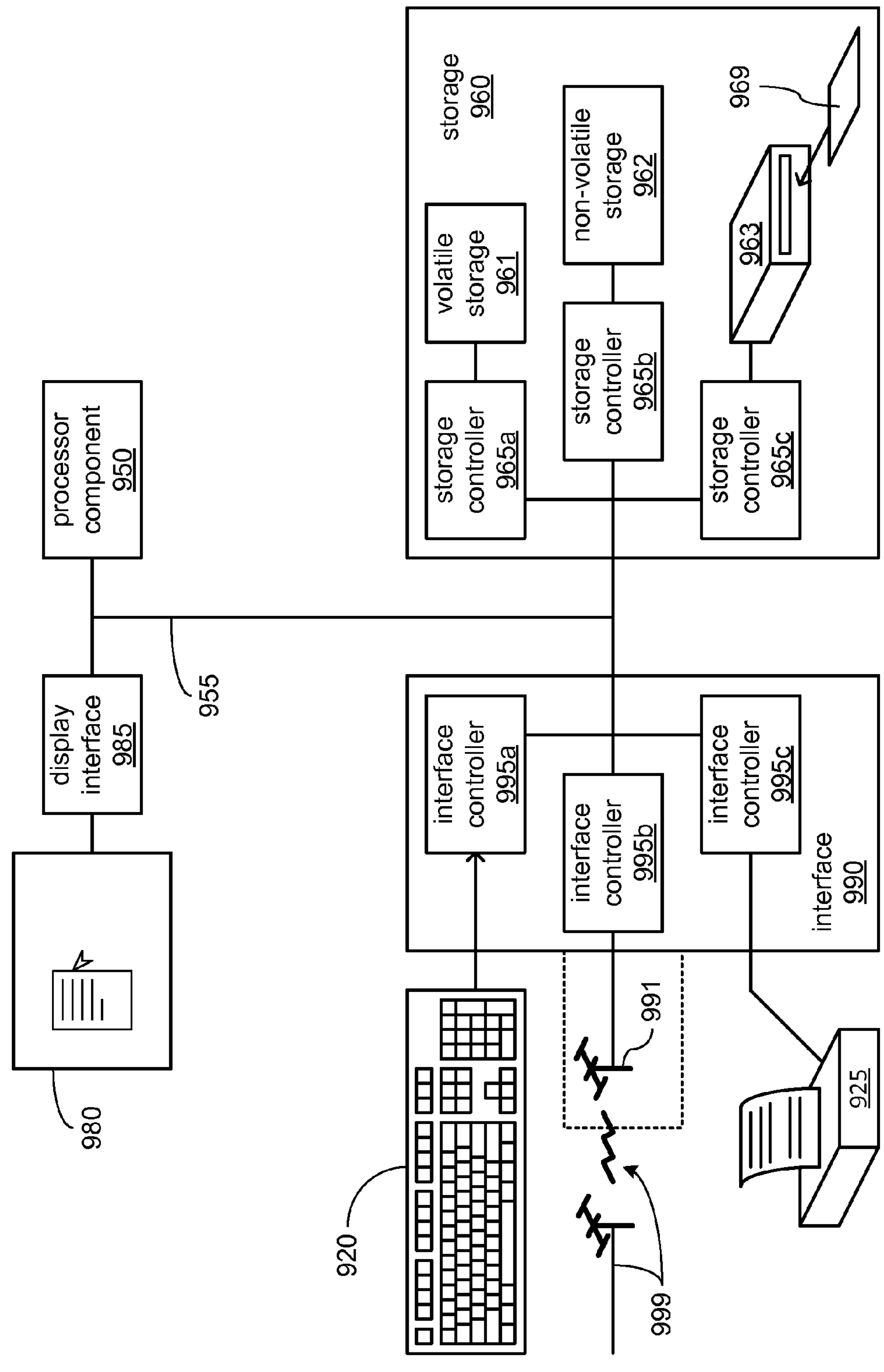
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of the computing device 300. It should be noted that components of the processing architecture 3000 are given reference numbers in which the last two digits correspond to the last two digits of reference numbers of at least some of the components earlier depicted and described as part of one or more of the computing devices 100, 300 or 500. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150 and 350) may include any of a wide variety of commercially available processors, employing any of a wide variety of technologies and implemented with one or more cores physically combined in any of a number of ways.

As previously discussed, the storage 960 (corresponding to one or more of the storages 160 and 360) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller **965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965***c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to one or more of the interfaces 190 and 390) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network made up of one or more links, smaller networks, or perhaps the Internet). More specifically, the interface controller 995*b* may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to one or more of the displays 180 and 380), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression “coupled” and “connected” along with their derivatives. These terms are not necessarily intended as synonyms for each other. For example, some embodiments may be described using the terms “connected” and/or “coupled” to indicate that two or more elements are in direct physical or electrical contact with each other. The term “coupled,” however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms “including” and “in which” are used as the plain-English equivalents of the respective terms “comprising” and “wherein,” respectively. Moreover, the terms “first,” “second,” “third,” and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In some examples, an apparatus to determine a location may include a processor component and a location provider for execution by the processor component. The location provider may include a location baseband to determine a current location in a venue based on wireless signals received from a location network of the venue, a verification component to verify a trusted location application associated with the venue based on credentials received from the location network and the trusted location application, and an encryption component to encrypt location information indicating the current location and convey the location information to the trusted location application through a location manager interposed between the location provider and the trusted location application based on verification of the trusted location application. Such examples may further include an antenna and an interface coupled to the antenna to receive wireless signals from a location network of a venue, and the baseband may be coupled to the interface.

Additionally or alternatively, the location provider may include a location engine to convert raw data generated by the location baseband from the wireless signals and indicative of the current location into the location information.

Additionally or alternatively, the apparatus may include an interface to receive the wireless signals, the wireless signals transmitted by a station (STA) of the location network disposed at the venue, the signals conveying the credentials.

Additionally or alternatively, the apparatus may include an interface to receive the wireless signals, the wireless signals transmitted by one or more access points (APs) of the location network, the one or more APs disposed about the venue.

Additionally or alternatively, the location baseband may receive a location almanac from an AP of the one or more APs, the location almanac indicating locations of the one or more APs within the venue and at least one characteristic of the one or more APs.

Additionally or alternatively, the at least one characteristic may include a signal strength of a wireless signal of the wireless signals transmitted by the one or more APs, a time-of-flight, a difference in time of arrival, or an angle of arrival, an angle of departure.

Additionally or alternatively, the verification component may receive credentials from an AP of the one or more APs and verify the trusted location application based at least on the credentials received from the trusted location application and the AP.

Additionally or alternatively, the apparatus may include the location manager, the location manager may distribute the location information to multiple location applications, and the multiple location applications may include the trusted location application and an untrusted location application.

Additionally or alternatively, the location manager may be for execution by the processor component.

Additionally or alternatively, the location provider may signal the location manager with a request to convey the location information to no other location application except the trusted location application.

Additionally or alternatively, the apparatus may include the trusted location application, and the trusted location application may signal the location manager with a request to convey the location information to no other application except the trusted location application.

Additionally or alternatively, the trusted location application may be for execution by the processor component.

Additionally or alternatively, the apparatus may include the trusted location application, the trusted location application may provide credentials to the verification component and receive the location information from the location manager, and the trusted location application may include a decryption component to decrypt the location information.

Additionally or alternatively, the location network may include multiple APs disposed about the venue, the location provider may receive a location data indicating items offered within the venue and locations of the items within the venue from an AP of the multiple APs, the location provider may convey the location data to the trusted location application, and the trusted location application may include a correlation component to correlate the current location with an item of the items offered within the venue.

Additionally or alternatively, the apparatus may include a display and the trusted location application may include a presentation component to visually present a map of the venue and the current location on the map.

Additionally or alternatively, the trusted location application may include a presentation component to present an indication of a promotion associated with an item of the items offered within the venue.

Additionally or alternatively, the location provider may receive a first key from the location network, and the encryption component to encrypt the location information using the first key.

Additionally or alternatively, the apparatus may include the trusted location application, and the trusted location application may receive the location information from the location manager and to decrypt the location information using a second key related to the first key.

Additionally or alternatively, the credentials received from the location network may include the first key and the credentials of the trusted location component may include the second key.

In some examples, an apparatus to determine a location may include a processor component, an interface to communicatively couple the processor component to a location network of a venue; and a verification component for execution by the processor component to transmit credentials via the location network to a mobile device within the venue, receive from the mobile device an indication of results of verification of a trusted location application of the mobile device using the credentials, and to condition transmission of a location data to the mobile device on the results, the location data indicating items offered within the venue and locations of the items within the venue.

Additionally or alternatively, the verification component may condition transmission of a location almanac to the mobile device on the results, the location almanac indicating locations of multiple access points (APs) of the location network disposed about the venue and at least one characteristic of the multiple APs.

Additionally or alternatively, the at least one characteristic may include a signal strength of a wireless signal of wireless signals transmitted by the multiple APs.

Additionally or alternatively, the apparatus may include a location services component for execution by the processor component to cooperate with multiple access points (APs) of the location network to transmit wireless signals to enable the mobile device to determine a current location of the mobile device within the venue, the multiple APs disposed about the venue.

Additionally or alternatively, the verification component may transmit the credentials to an AP of the multiple APs to enable the AP to transmit the credentials to the mobile device.

Additionally or alternatively, the credentials may include a first key to enable a location provider of the mobile device to encrypt location information indicating the current location to be conveyed to the trusted location application through a location manager of the mobile device, the first key related to a second key associated with the trusted location application to enable the trusted location application to decrypt the location information.

In some examples, a computer-implemented method for determining a location may include determining at a mobile device a current location of the mobile device in a venue based on wireless signals received from a location network of the venue; receiving at the mobile device first credentials from the location network; verifying a trusted location application of the mobile device using the first credentials and second credentials of the trusted location application; and encrypting location information indicating the current location and conveying the location information to the trusted location application through a location manager of the mobile device based on verification of the trusted location application.

Additionally or alternatively, the method may include receiving the wireless signals from one or more access points (APs) of the location network, the one or more APs disposed about the venue.

Additionally or alternatively, the method may include receiving a location almanac from an AP of the one or more APs, the location almanac indicating locations of the one or more APs within the venue and at least one characteristic of the one or more APs.

Additionally or alternatively, the at least one characteristic may include a signal strength of a wireless signal of the wireless signals transmitted by the one or more APs.

Additionally or alternatively, the method may include receiving the first credentials from an AP of the one or more APs.

Additionally or alternatively, the location manager may distribute the location information to multiple location applications, and the multiple location applications may include the trusted location application and an untrusted location application.

Additionally or alternatively, the method may include signaling the location manager with a request to convey the location information to no other location application except the trusted location application.

Additionally or alternatively, the method may include receiving the second credentials from the trusted location application, and decrypting the location information at the trusted location application.

Additionally or alternatively, the location network may include multiple APs disposed about the venue; and the method may include receiving a location data indicating items offered within the venue and locations of the items within the venue from an AP of the multiple APs, conveying the location data to the trusted location application, and correlating at the trusted location application the current location with an item of the items offered within the venue.

Additionally or alternatively, the method may include visually presenting a map of the venue and the current location on the map.

Additionally or alternatively, the method may include presenting an indication of a promotion associated with an item of the items offered within the venue.

Additionally or alternatively, the method may include receiving a first key from the location network and encrypting the location information using the first key.

Additionally or alternatively, the method may include decrypting the location information using a second key related to the first key.

Additionally or alternatively, the first credentials may include the first key and the second credentials may include the second key.

In some examples, at least one machine-readable storage medium may include instructions that when executed by a computing device, cause the computing device to determine at a mobile device a current location of the mobile device in a venue based on wireless signals received from a location network of the venue, receive at the mobile device first credentials from the location network, verify a trusted location application of the mobile device using the first credentials and second credentials of the trusted location application, and encrypt location information indicating the current location and convey the location information to the trusted location application through a location manager of the mobile device based on verification of the trusted location application.

Additionally or alternatively, the computing device may be caused to receive the wireless signals from one or more access points (APs) of the location network, the one or more APs disposed about the venue.

Additionally or alternatively, the computing device may be caused to receive a location almanac from an AP of the one or more APs, the location almanac indicating locations of the one or more APs within the venue and at least one characteristic of the one or more APs.

Additionally or alternatively, the at least one characteristic may include a signal strength of a wireless signal of the wireless signals transmitted by the one or more APs.

Additionally or alternatively, the computing device may be caused to receive the first credentials from an AP of the one or more APs.

Additionally or alternatively, the location manager may distribute the location information to multiple location applications, and the multiple location applications may include the trusted location application and an untrusted location application.

Additionally or alternatively, the computing device may be caused to signal the location manager with a request to convey the location information to no other location application except the trusted location application.

Additionally or alternatively, the computing device may be caused to receive the second credentials from the trusted location application, and decrypt the location information at the trusted location application.

Additionally or alternatively, the computing device may be caused to receive a location data indicating items offered within the venue and locations of the items within the venue from an AP of multiple APs of the location network, convey the location data to the trusted location application, and correlate at the trusted location application the current location with an item of the items offered within the venue.

Additionally or alternatively, the computing device may be caused to visually present a map of the venue and the current location on the map.

Additionally or alternatively, the computing device may be caused to present an indication of a promotion associated with an item of the items offered within the venue.

Additionally or alternatively, the computing device may be caused to receive a first key from the location network, and encrypt the location information using the first key.

Additionally or alternatively, the computing device may be caused to decrypt the location information using a second key related to the first key.

Additionally or alternatively, the first credentials may include the first key and the second credentials may include the second key.

In some examples, at least one machine-readable storage medium may include instructions that when executed by a computing device, cause the computing device to perform any of the above.

In some examples, an apparatus to assign processor component cores to perform task portions may include means for performing any of the above.

The invention claimed is:

1. An apparatus comprising:

a processor component, at least a portion of which is implemented in hardware; and a location provider for execution by the processor component, the location provider comprising:

a location baseband to determine a current location in a venue based on wireless signals received from a location network of the venue;

a verification component to verify a trusted location application associated with the venue based on credentials received from the location network and the trusted location application; and an encryption component to, in response to a request of the trusted location application for a location manager to forgo conveying the current location to untrusted applications:

encrypt location information indicating the current location; and convey the encrypted location information to the trusted location application through the location manager interposed between the location provider and the trusted location application based on verification of the trusted location application.

2. The apparatus of claim 1, comprising the location manager, the location manager to distribute the location information to multiple location applications, the multiple location applications comprising the trusted location application and an untrusted location application.

3. The apparatus of claim 2, comprising the trusted location application, the misted location application to signal the location manager with a request to convey the location information to no other application except the trusted location application.

4. The apparatus of claim 1, comprising the trusted location application, the trusted location application to provide credentials to the verification component and receive the location information from the location manager, and the trusted location application comprising a decryption component to decrypt the location information.

5. The apparatus of claim 4, the location network comprising multiple APs disposed about the venue, the location provider to receive a location data indicating items offered within the venue and locations of the items within the venue from an AP of the multiple APs, the location provider to convey the location data to the trusted location application, and the trusted location application comprising a correlation component to correlate the current location with an item of the items offered within the venue.

6. The apparatus of claim 5, comprising a display and the trusted location application comprising a presentation component to visually present a map of the venue and the current location on the map.

7. The apparatus of claim 1, the location provider to receive a first key from the location network, and the encryption component to encrypt the location information using the first key.

8. The apparatus of claim 7, comprising the trusted location application, the trusted location application to receive the location information from the location manager and to decrypt the location information using a second key related to the first key.

9. An apparatus comprising:

an antenna;

an interface coupled to the antenna to receive wireless signals from a location network of a venue;

a processor component; and a location provider for execution by the processor component comprising:

a location baseband coupled to the interface to determine a current location in the venue based on the wireless signals;

a verification component to verify a trusted location application associated with the venue based on credentials received from the location network and the trusted location application; and an encryption component to, in response to a request of the trusted location application for a location manager to forgo conveying the current location to untrusted applications:

encrypt location information indicating the current location; and convey the encrypted location information to the trusted location application through the location manager interposed between the location provider and the trusted location application based on verification of the trusted location application.

10. The apparatus of claim 9, the interface to receive the wireless signals from one or more access points (APs) of the location network, the one or more APs disposed about the venue.

11. The apparatus of claim 10, the verification component to receive credentials from an AP of the one or more APs and verify the trusted location application based at least on the credentials received from the trusted location application and the AP.

12. A computing-implemented method comprising:

determining at a mobile device a current location of the mobile device in a venue based on wireless signals received from a location network of the venue;

receiving at the mobile device first credentials from the location network;

verifying a trusted location application of the mobile device using the first credentials and second credentials of the trusted location application; and in response to a request of the trusted location application for a location manager to forgo conveying the current location to untrusted applications, encrypting location information indicating the current location and conveying the encrypted location information to the trusted location application through the location manager of the mobile device based on verification of the trusted location application.

13. The computer-implemented method of claim 12, comprising receiving the wireless signals from one or more access points (APs) of the location network, the one or more APs disposed about the venue.

14. The computer-implemented method of claim 13, comprising receiving a location almanac from an AP of the one or more APs, the location almanac indicating locations of the one or more APs within the venue and at least one characteristic of the one or more APs.

15. The computer-implemented method of claim 12, the location manager to distribute the location information to multiple location applications, the multiple location applications comprising the trusted location application and an untrusted location application.

16. The computer-implemented method of claim 15, comprising signaling the location manager with a request to convey the location information to no other location application except the trusted location application.

17. The computer-implemented method of claim 12, comprising:

receiving the second credentials from the trusted location application; and decrypting the location information at the trusted location application.

18. At least one non-transitory machine-readable storage medium comprising instructions that when executed by a computing device, cause the computing device to:

determine at a mobile device a current location of the mobile device in a venue based on wireless signals received from a location network of the venue;

receive at the mobile device first credentials from the location network;

verify a trusted location application of the mobile device using the first credentials and second credentials of the trusted location application; and in response to a request of the trusted location application for a location manager to forgo conveying the current location to untrusted applications, encrypt location information indicating the current location and convey the encrypted location information to the trusted location application through the location manager of the mobile device based on verification of the trusted location application.

19. The at least one non-transitory machine-readable storage medium of claim 18, the computing device caused to receive the wireless signals from one or more access points (APs) of the location network, the one or more APs disposed about the venue.

20. The at least one non-transitory machine-readable storage medium of claim 19, the computing device caused to receive a location almanac from an AP of the one or more APs, the location almanac indicating locations of the one or more APs within the venue and at least one characteristic of the one or more APs.

21. The at least one non-transitory machine-readable storage medium of claim 20, the at least one characteristic comprising a signal strength of a wireless signal of the wireless signals transmitted by the one or more APs.

22. The at least one non-transitory machine-readable storage medium of claim 19 the computing device caused to receive the first credentials from an AP of the one or more APs.

23. The at least one non-transitory machine-readable storage medium of claim 18, the computing device caused to:

receive the second credentials from the trusted location application; and decrypt the location information at the trusted location application.

24. The at least one non-transitory machine-readable storage medium of claim 18, the computing device caused to:

receive a first key from the location network; and encrypt the location information using the first key.

25. The at least one non-transitory machine-readable storage medium of claim 24, the computing device caused to decrypt the location information using a second key related to the first key.

* * * * *